US007493137B2

(12) United States Patent
Iwanaga et al.

(10) Patent No.: US 7,493,137 B2
(45) Date of Patent: Feb. 17, 2009

(54) MOBILE STATION AND BASE STATION SELECTION SCHEME

(75) Inventors: Mitsuo Iwanaga, Yokohama (JP);
Takehiro Ida, Yokosuka (JP); Wataru Matsuno, Yokohama (JP); Nobukazu Uno, Kamakura (JP)

(73) Assignee: NTT DoCoMo Inc., Tokyo (JP)

( * ) Notice: Subject to any disclaimer, the term of this patent is extended or adjusted under 35 U.S.C. 154(b) by 370 days.

(21) Appl. No.: 10/854,945

(22) Filed: May 27, 2004

(65) Prior Publication Data
US 2005/0009555 A1  Jan. 13, 2005

(30) Foreign Application Priority Data
May 29, 2003  (JP)  ............................. 2003-152759

(51) Int. Cl.
*H04Q 7/20*  (2006.01)
(52) U.S. Cl. ................... 455/525; 455/432.1; 455/436; 455/437; 455/444; 455/445; 370/331; 370/332; 370/333; 370/334
(58) Field of Classification Search ............. 455/432.1, 455/436–446, 524, 525; 370/331–334
See application file for complete search history.

(56) References Cited

U.S. PATENT DOCUMENTS

| 5,722,070 A * | 2/1998 | Alford ........................ 455/425 |
| 6,430,414 B1 * | 8/2002 | Sorokine et al. ............. 455/442 |
| 6,434,389 B1 * | 8/2002 | Meskanen et al. ........... 455/437 |
| 6,760,599 B1 * | 7/2004 | Uhlik ........................ 455/525 |
| 7,110,765 B2 * | 9/2006 | Amerga et al. .............. 455/436 |
| 2004/0116145 A1 * | 6/2004 | Smolyar et al. ............. 455/524 |

FOREIGN PATENT DOCUMENTS

JP  2000-299885 A  10/2000

(Continued)

OTHER PUBLICATIONS

3GPP TS 25.304, "3rd Generation Partnership Project; Technical Specification Group Radio Access Network; UE Procedures in Idle Mode and Procedures for Cell Reselection in Connected Mode" *3GPP*, v3.10.0, released in 1999, total 40 pages.

(Continued)

*Primary Examiner*—Edward Urban
*Assistant Examiner*—Fayyaz Alam
(74) *Attorney, Agent, or Firm*—Brinks Hofer Gilson & Lione

(57) ABSTRACT

The present invention provides a mobile station able to shorten the processing time of selecting a serving base station and able to select an appropriate serving base station with which the mobile station communicates.

Mobile phone 40 receives an advertisement message from a peripheral base station 30, until state of communication path to the peripheral base station remains above a reference level over the predetermined time period, 'Treselection', wherein the reference level is calculated by adding the parameter 'Qhyst' to state of communication path to the current serving base station.

After detecting peripheral base station 30, mobile phone 40 ignores the detection that the condition of changing base stations is fulfilled for another peripheral base station 30, until data storage area is updated in accordance with an advertisement message from the peripheral base station 30.

3 Claims, 15 Drawing Sheets

FOREIGN PATENT DOCUMENTS

| | | |
|---|---|---|
| JP | 2003-507981 A | 3/2003 |
| WO | WO 01/15482 A1 | 3/2001 |

OTHER PUBLICATIONS

Office Action issued Feb. 26, 2008 in Japanese patent application No. 2003-152759 (with translation).

3GPP TS 25.304, "3rd Generation Partnership Project; Technical Specification Group Radio Access Network; UE Procedures in Idle Mode and Procedures for Cell Reselection in Connected Mode" *3GPP*, v3.10.0, released in 1999, total 40 pages.

* cited by examiner

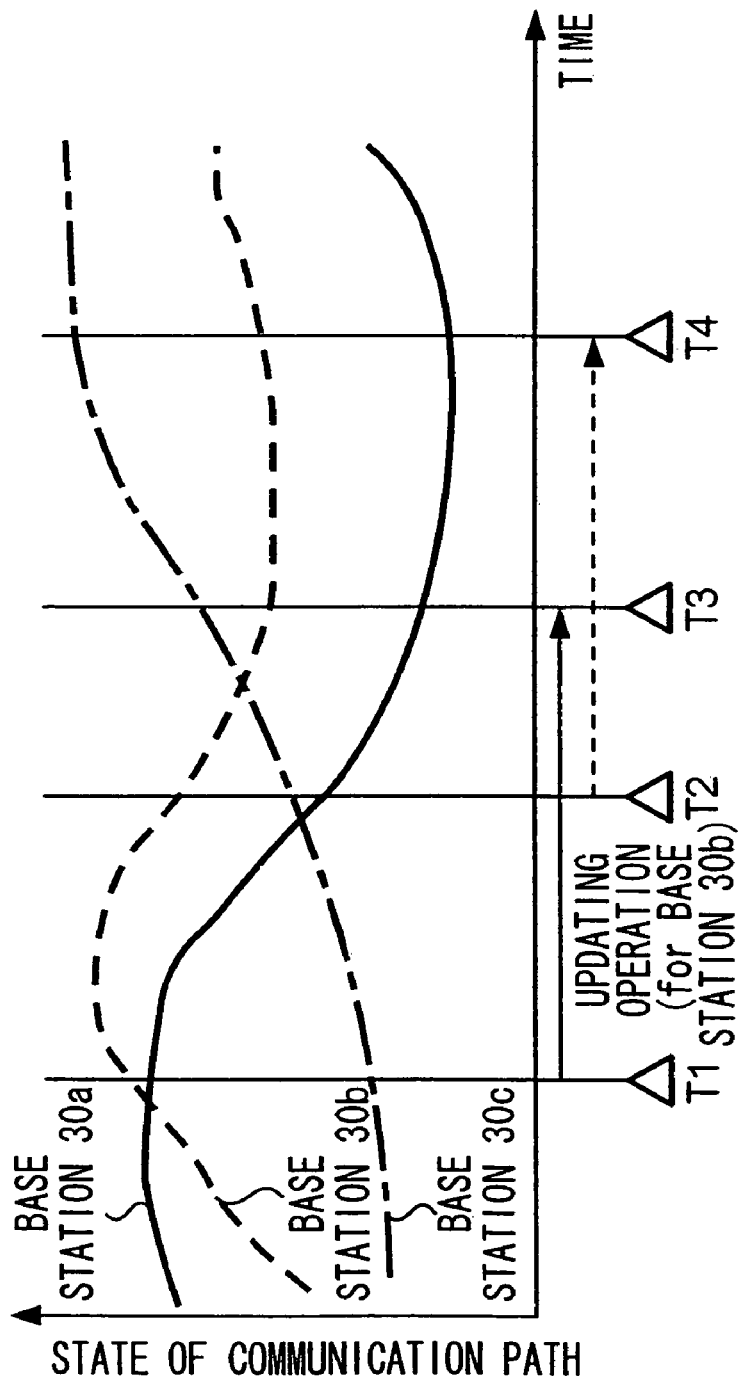

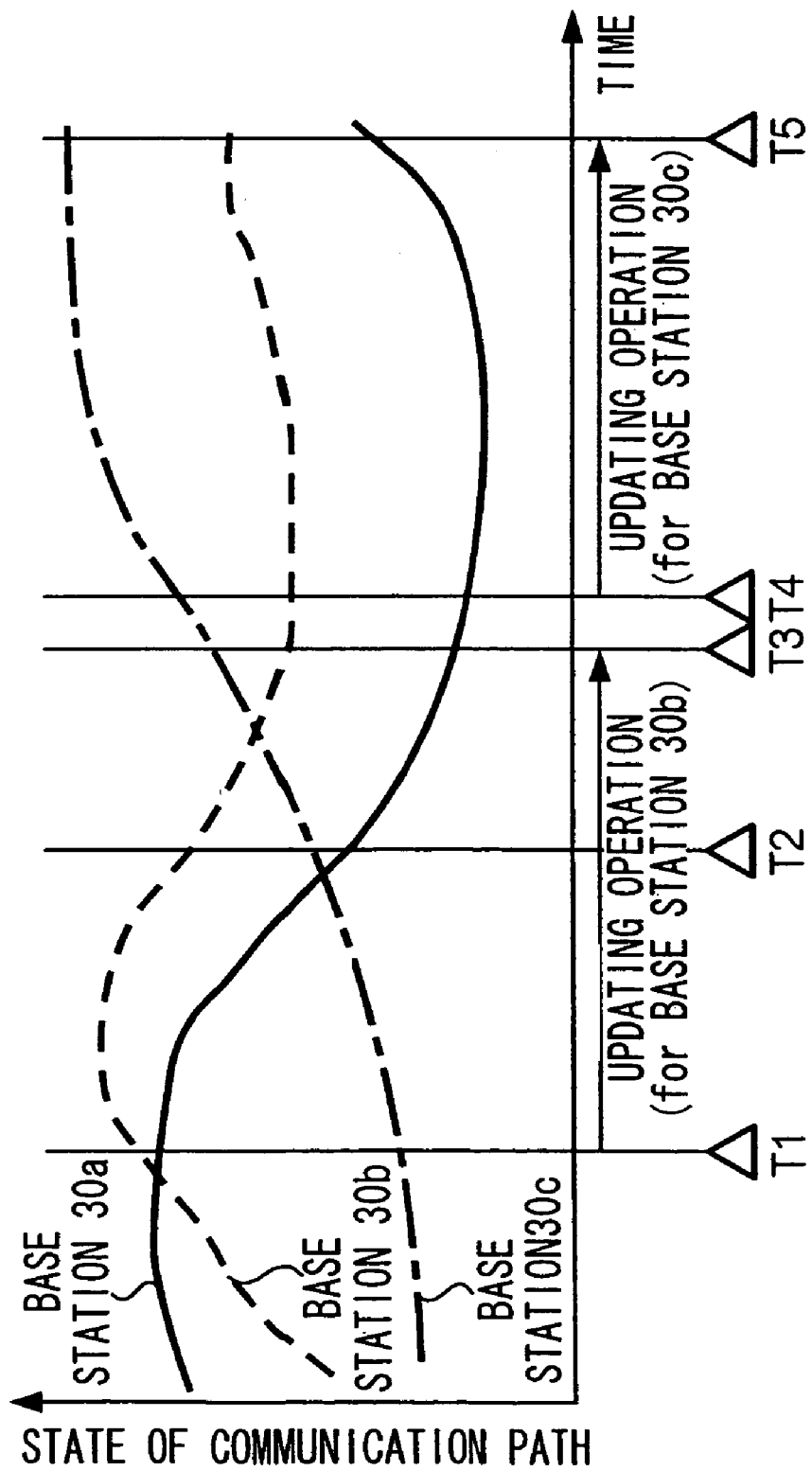

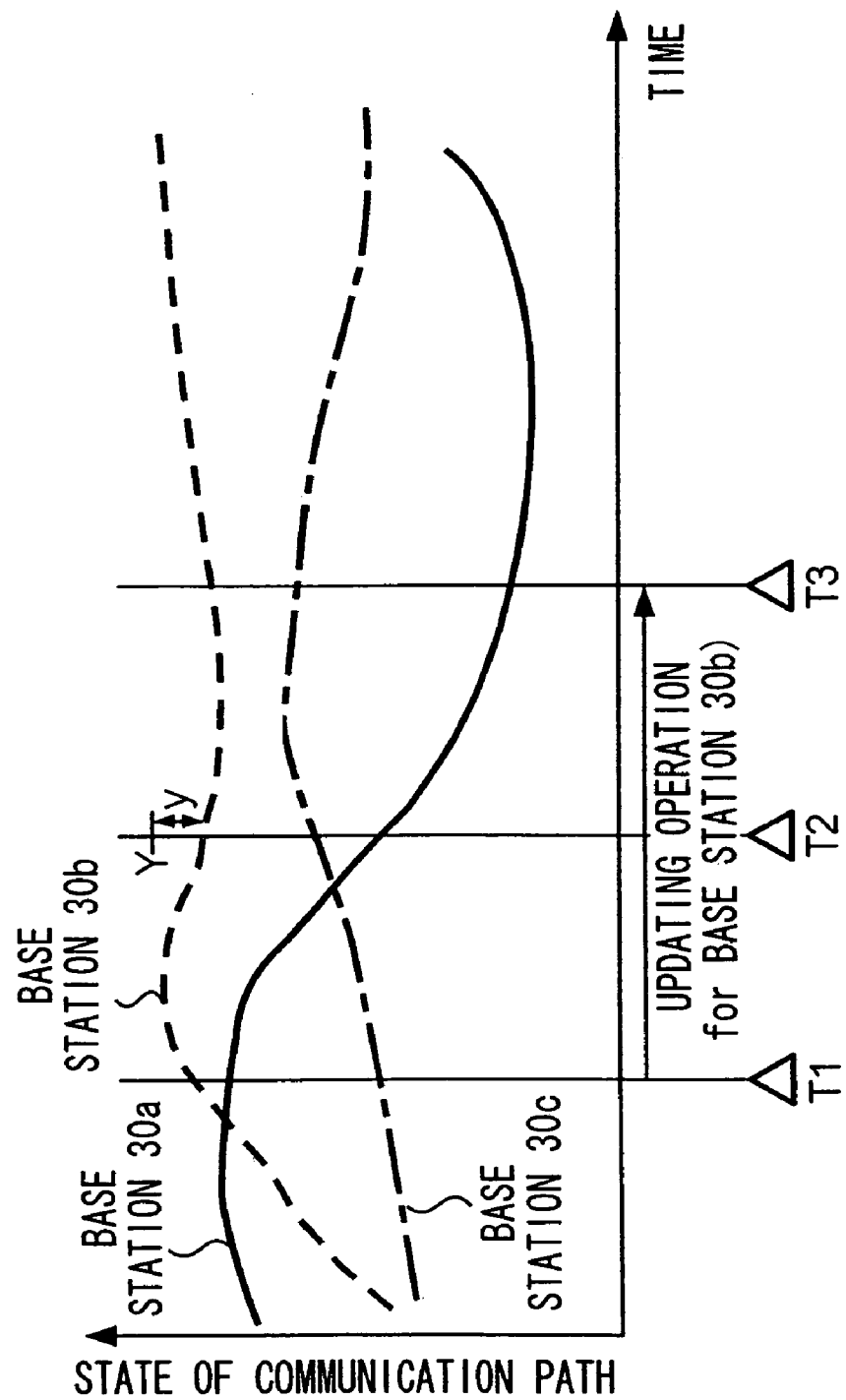

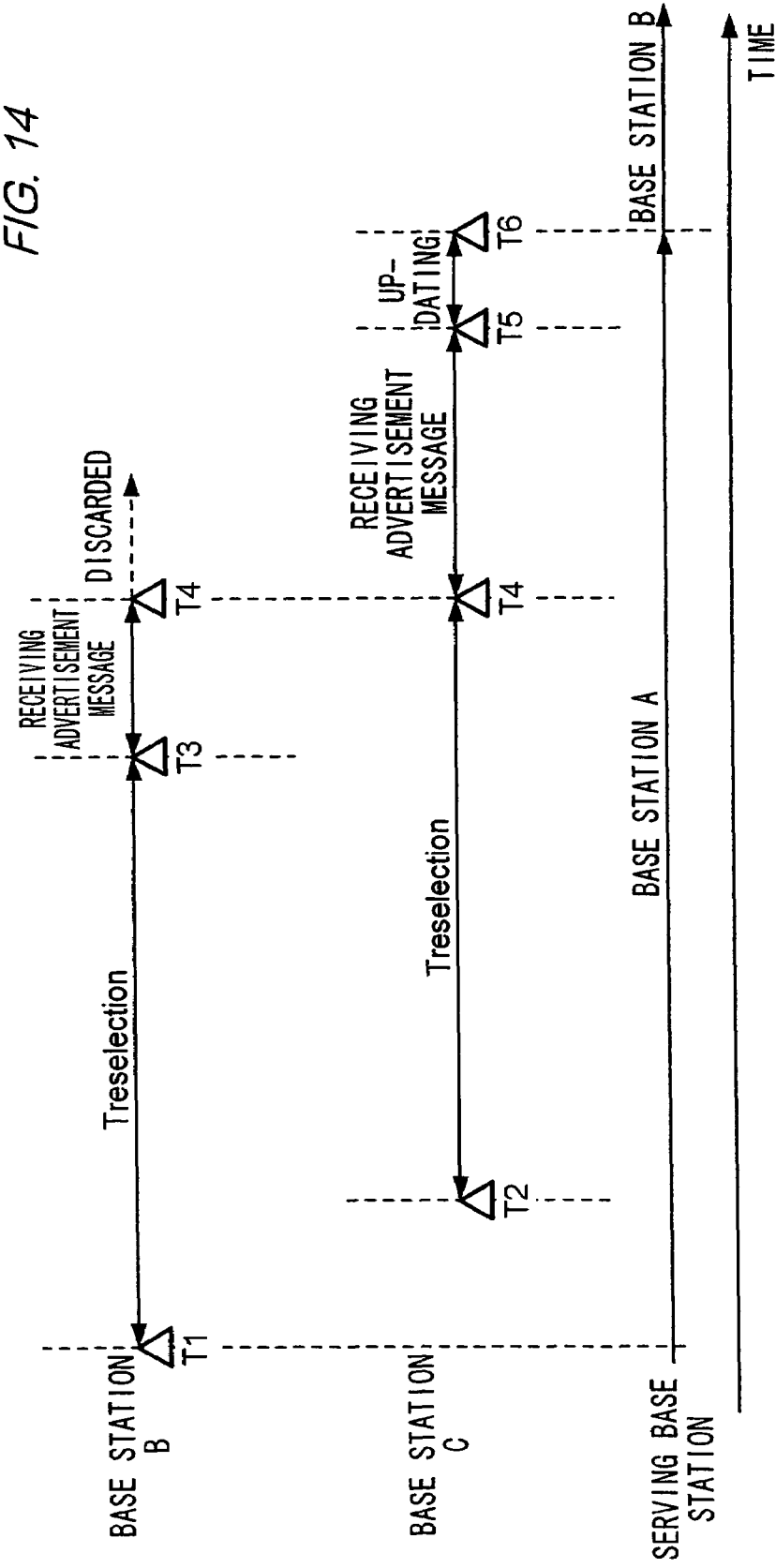

MOBILE STATION AND BASE STATION SELECTION SCHEME

This application claims priority under 35 U.S.C. §119 to Japanese Patent Application No. 2003-152759 filed May 29, 2003, the entire content of which is hereby incorporated by reference.

TECHNICAL FIELD

The present invention relates to selecting a base station which handles communication to and from a mobile station.

RELATED ART

In a case that a mobile station is located on or near a border of a wireless communication cell (hereafter simply referred to as a cell), a plurality of base stations may be able to handle communication for the mobile station. In such a case, the mobile station can select from among a plurality of base stations a base station to use for communication on the basis of a quality of a communication path with that base station. However, a drawback incurred when a mobile station is roaming in a proximity of, for example, a border between a cell A covered by a base station A and a cell B covered by a base station B, is that the mobile station may frequently switch between the base stations depending on a state of a communication path to the base station at any given time. Frequent switching results in a large power consumption in the mobile station.

To address this problem, Japanese patent publication JP 2000-A-299885 discloses a mobile station, which switches between base stations for communication to another base station for communication, if a) a difference between a reception level of a perch channel of the base station currently handling communication from a mobile station and a reception level of the perch channel of the another base station is greater than a predetermined criterion, and b) a series of a predetermined number of measurements reveal that the condition a) is met.

IMT-2000 (International Mobile Telecommunication 2000) standards, for example, prescribes a mobile station which selects a base station to communicate with, on the basis of equation (1) using two parameters 'Qhyst' and 'Treselection'.

$$\text{(state of communication path to a peripheral base station)} > \text{(state of communication path to a serving base station)} + Qhyst \quad (1)$$

A method for selecting a base station for communication, used in a mobile station in conformity with the IMT-2000 standard, will now be described with reference to FIGS. 13 and 14.

In equation 1, 'serving base station' means a base station currently communicating with a mobile station; and a 'peripheral base station' means any one of another base station able to communicate with the mobile station. 'Qhyst' is a parameter for adjusting a state of a communication path. In FIGS. 13 and 14, 'Treselection' is a parameter of a time period and is used to adjust base station selection sensitivity. These parameters 'Qhyst' and 'Treselection' are described in the specification of 3GPP TS25.304, and those descriptions are incorporated into this description by reference. In the example shown in FIGS. 13 and 14, base station A is first selected as a serving base station and base stations B and C are available as peripheral base stations before timing T1.

In the example shown in FIG. 13, equation 1 is applied to a mobile station, a serving base station (base station A), and a peripheral base station (base station B) at and from timing T1. At timing T2, the elapsed time starting from timing T1 becomes greater than 'Treselection'. Then, the mobile station starts receiving an advertisement message transmitted from base station B. At timing T3, receipt of the advertisement message from base station B at the mobile station is complete. At timing T4, the mobile station stores, in a memory, data required for communicating with base station B, such as data specifying a radio channel to be used for communication. Then, base station B acts as a serving base station.

In the example shown in FIG. 14, equation 1 holds also for a mobile station, a serving base station (base station A), and another peripheral base station (base station C) at and from timing T2, before the mobile station starts receiving an advertisement message transmitted from base station B at timing T3. At timing T4, the elapsed time starting from timing T2 becomes greater than 'Treselection', when mobile station starts receiving an advertisement message from base station B. Then the mobile station stores in a memory data required for communicating with base station C, instead of data for base station B. After this, base station C acts as a serving base station.

In the example shown in FIG. 13, base station B is not able to act as a serving base station until timing T4, even in a case that the condition for acting as a serving base station is fulfilled for the base station B at timing T2.

In the example shown in FIG. 14, mobile station discards receipt of an advertisement message from base station B at the event that the condition required to act as a serving base station is fulfilled for base station C at timing T4 while receiving an advertisement message from the base station B, even in a case that a state of a communication path to base station B supercedes a state of a communication path to base station C. Then mobile station starts receiving an advertisement message from base station C. Accordingly, the mobile station according to the related art may on occasion select an inappropriate base station for communication.

In the example shown in FIG. 14, base station A continues to act as a serving base station until timing T6, even after that the conditions required to act as serving base stations are fulfilled for base station B at timing T3 and for base station C at timing T4. Further, if the condition required to act a serving base station is fulfilled for another peripheral base station after timing T4 while the mobile station is receiving an advertisement message from base station C, base station A continues to act as a serving base station beyond timing T6. In such a situation, the mobile station may not be able to establish a new connection with base station A in a case that a state of the communication path to base station A is poor.

SUMMARY OF THE INVENTION

The present invention has been conceived in view of the situation described above, and provides a mobile station by which it becomes possible to shorten a processing time for selecting a serving base station, and which makes it possible to select an appropriate serving base station for communication.

The present invention provides a mobile station having a storage unit for storing information required for communication with a first base station, the first base station being identified by the information stored in the storage unit; an information receiving unit for receiving either from the first base station information required for communication with the first base station or from another base station information required for communication with the another base station; a measuring unit for measuring a state of a communication path to the first base station and a state of a communication path to the another base station; a first determining unit for determining whether the measured state of the communication path to the another base station is superior to a reference level defined on the basis of the measured state of the communication path to the first base station; a second determining unit for determining, in a case that the measured state of the communication path to the another base station is determined to be superior to the reference level defined on the basis of the measured sate of the communication path to the first base station, whether the measured state of the communication path to the another base station remains superior to the reference level over a predetermined time period; and a communication unit for communicating with the first base station, wherein, when it is determined over the predetermined time period that the state of the communication path to the another base station remains superior to the reference level, the information stored in the storage unit is updated with the information received in the information receiving unit from the another base station.

The present invention also provides a mobile station having a measuring unit for measuring states of communication paths to base stations; a selecting unit for selecting a base station from among the plurality of base stations on the basis of a state of a communication path to the selected base stations; a receiving unit for receiving from the base station selected by the selecting unit information required for communication with the base station; a storage unit for storing the information received by the receiving unit; and a unit for communicating with the base station identified by the information stored in the storage unit, wherein after selecting the base station, the selecting unit does not select another base station until that the received information is stored in the storage unit. This mobile station is referred to as a second-type mobile station.

In the second-type mobile station according to the present invention: after the first base station is selected, the received information required for communication with the first base station is stored in the storage unit, the selecting unit may select a second base station, and the storage unit may store a record of the detection of the second base station selected by the selecting unit; and after the information is stored in the storage unit, the measuring unit may measure states of communication paths to the first base station and to the second base station, the selecting unit may select a base station among the first base station and the second base station, on the basis of the state of communication path measured by the measuring unit, and the storage unit may store received information required for communication with the base station selected by the selecting unit.

Further, in the second-type mobile station according to present invention: in the case that the selecting unit selects a second base station after selecting a first base station before that the received information required for communication with the first base station is stored in the storage unit, the measuring unit may measure a state of the communication path to the first base station and a state of the communication path to the second base station, the selecting unit may select a base station among the first base station and the second base station, on the basis of the state of the communication path measured by the measuring unit, the receiving unit may receive from the base station selected by the selecting unit information required for communication with the base station, and the storage unit may store received information required for communication with the base station selected by the selecting unit.

Accordingly, the present invention provides a mobile station which makes it possible to shorten a processing time for selecting a serving base station, and which also makes it possible to select an appropriate serving base station for communication.

BRIEF DESCRIPTION OF DRAWINGS

FIG. 8 is a chart illustrating an operation of selecting a base station according to the second embodiment.

FIG. 10 is a chart for illustrating an operation of selecting a base station according to the third embodiment.

FIG. 12 is a chart for illustrating an operation of selecting a base station according to the fourth embodiment.

FIGS. 13 and 14 are timing charts illustrating operations of selecting a base station according to the related art.

PREFERRED EMBODIMENTS

Figure 1:
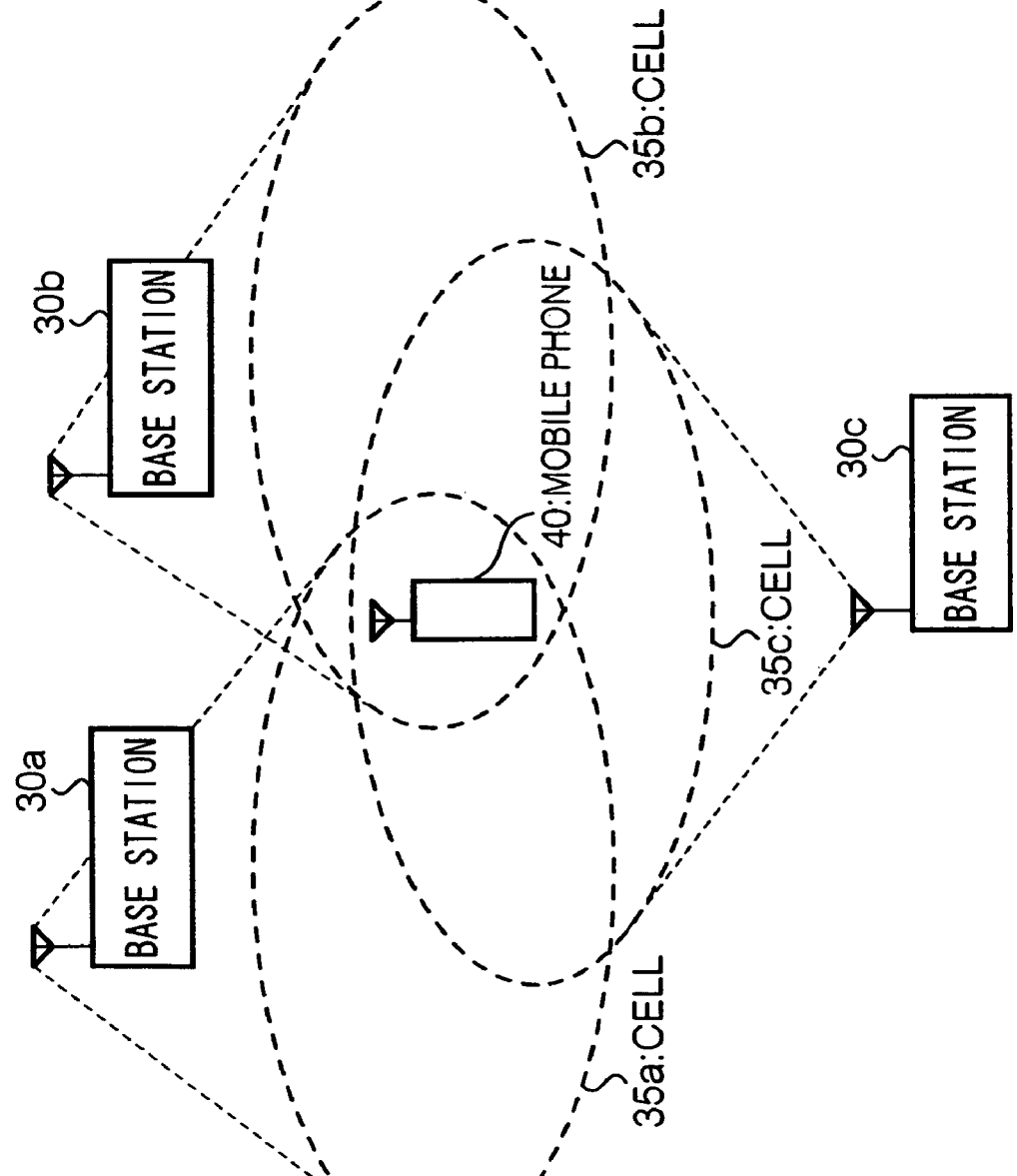
FIG. 1 is a drawing illustrating a configuration of a mobile phone network according to a first embodiment of the present invention.

Embodiment according to the present invention will now be described with reference to drawings. Like numerals will be used to designate like elements depicted in the drawings.

A. First Embodiment

A-1. Configuration
A-1-1. Mobile Phone Network

FIG. 1 is a drawing illustrating a configuration of a mobile phone network according to a first embodiment of the present invention. As shown in FIG. 1, mobile phone network 10 includes a plurality of base stations 30 (30a, 30b, 30c) and mobile phone 40. Mobile phone network 10 is configured in conformity with IMT-2000 standard.

Each base station 30 (30a, 30b, 30c) governs wireless communication within cell 35 (35a, 35b, 35c), respectively, and communicates with mobile station 40 located within the cell 35 which it governs. Base station 30 periodically transmits an advertisement message, within the cell 35 which it governs; the advertisement messages includes data for indicating available radio channel(s) or a base station ID (a cell ID).

Mobile phone 40 is able to perform voice communication with another mobile phone 40 accommodated in mobile phone network 10 or with a telephone connected to a fixed telephone network service (not shown in FIG. 1). In the example shown in FIG. 1, mobile phone 40 locates in the triple overlapped region of cells 35a, 35b, and 35c, and is able to communicate with any one of base stations 30a, 30b, and 30c. In such a case, mobile phone 40 communicates with base station 30 by selecting a most appropriate base station 30 among base stations 30a, 30b, and 30c.

A-1-2. Mobile Phone

Figure 2:
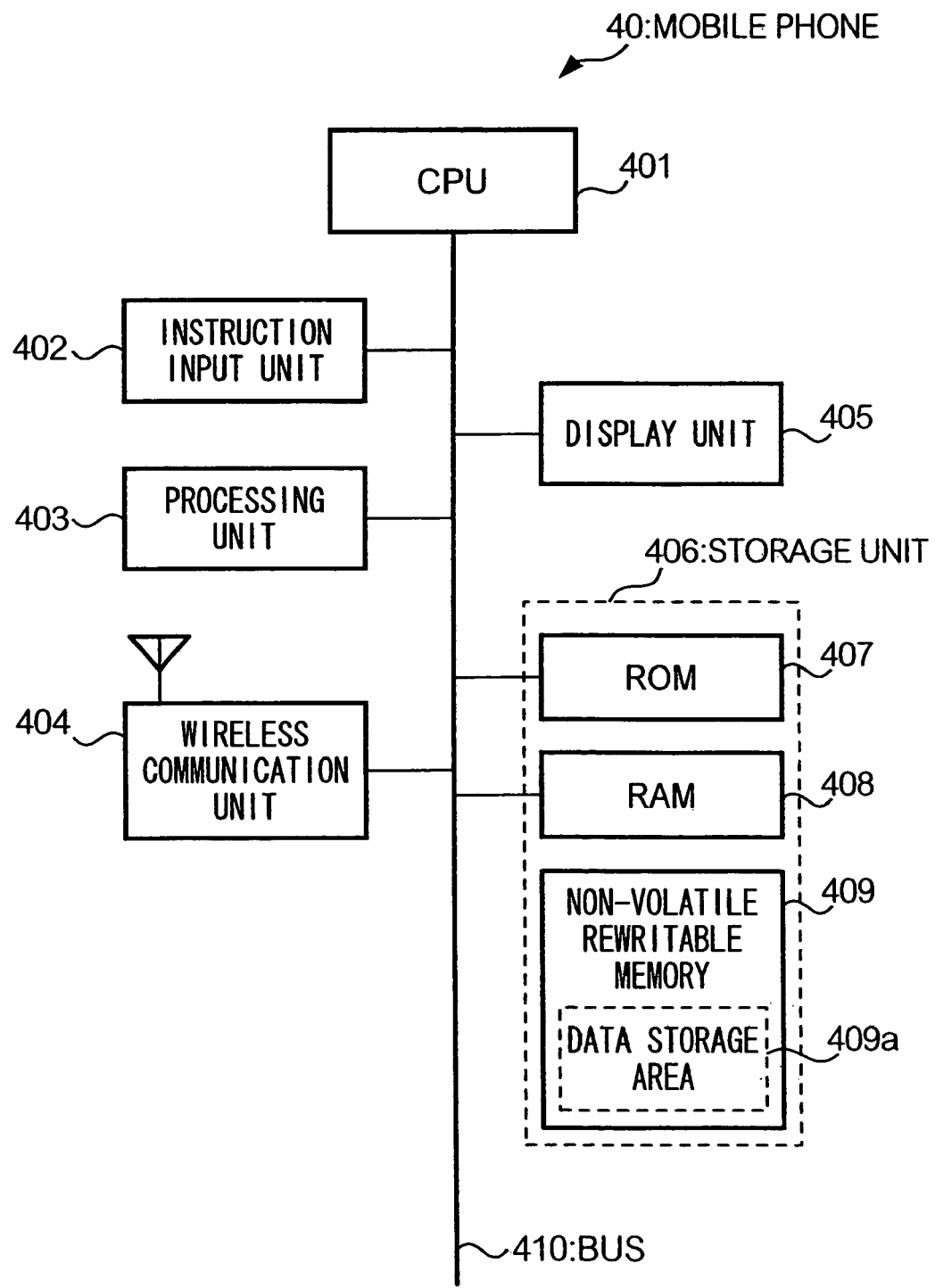
FIG. 2 is a block diagram illustrating a hardware configuration of a mobile phone according to the first embodiment.

FIG. 2 is a block diagram illustrating a hardware configuration of a mobile phone 40 according to the present embodiment. As shown in FIG. 2, mobile phone 40 includes CPU 401, instruction input unit 402, phone-call processing unit 403, wireless communication unit 404, display unit 405, and storage unit 406. These units are connected to each other via bus 410.

CPU 401 executes various programs stored in storage unit 406 so as to control the units connected to via bus 410. CPU 401 also includes a timer/counter unit (not shown in FIG. 2), and functions to measure a time period by using the timer/counter unit. Instruction input unit 402 has a keypad comprising a plurality of key tops for inputting figures, characters or operational commands, and outputs to CPU 401 signals corresponding to keys pressed. Phone-call processing unit 403 includes, for example, a microphone, a speaker, and a voice processing unit, and performs under the control of CPU 401 a phone-call operation including connecting/disconnecting a call.

Wireless communication unit 404 controls, under control of CPU 401, wireless communication to and from base station 30. Wireless communication unit 404 functions to measure a reception level of signal radio waves received from base station 30. Display unit 405 includes a LCD (Liquid Crystal Display) panel and a driving circuit for controlling the LCD panel.

Storage unit 406 includes ROM (Read Only Memory) 407, RAM (Random Access Memory) 408, and non-volatile rewritable memory 409. Non-volatile rewritable memory 409 provides with data storage area 409a. Data storage area 409a stores data received from base station 30, such as available radio channel(s) for communication to and from base station 30 and ID of the base station 30. Mobile phone 40 appropriately changes base station 30, in accordance with conditions such as a current location of mobile phone 40.

Non-volatile rewritable memory 409 stores 2 parameters, 'Qhyst' and 'Treselection', and both are used in an operation of selecting a base station. Details of the use of these parameters will be described later, with reference to FIG. 3. Similar to the related art described above, the parameter 'Qhyst' is a parameter for adjusting communication quality; and 'Treselection' is a time period parameter which is used for adjusting sensitivity when changing base stations. This parameter may be fixed at a constant value, or may be variable. In the latter example, base station 30 or switch station (not shown in FIG. 1) may set the parameters in accordance with communication traffic in mobile phone network 10 and/or a time of day, and notify them to mobile phone 40.

A-2. Operation

Figure 3:
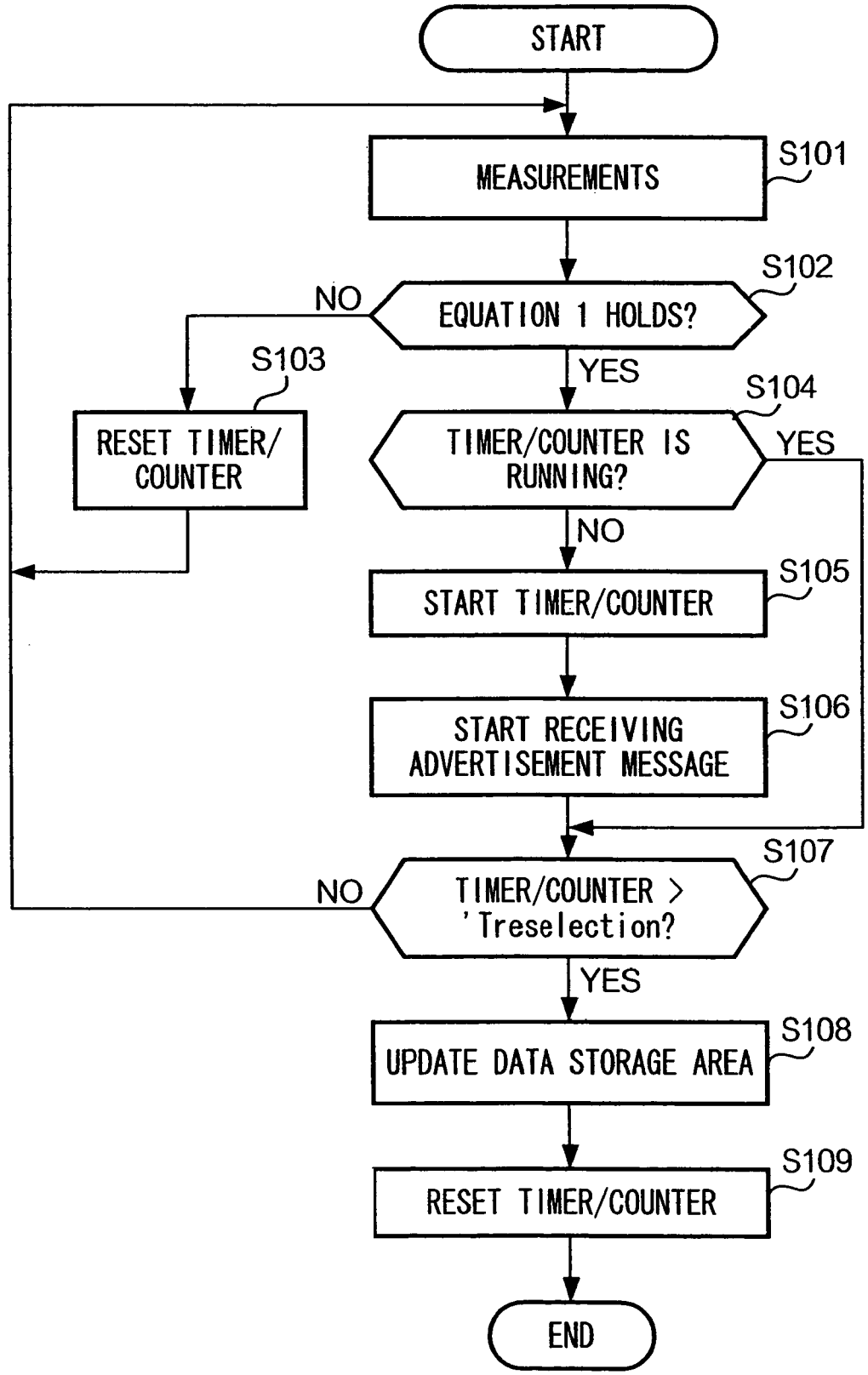
FIG. 3 is a flow chart illustrating an operation of selecting a base station performed by a CPU in a mobile phone according to the first embodiment.

FIG. 3 is a flow chart illustrating an operation of selecting a base station performed by CPU 401 of mobile phone 40 according to the first embodiment. Mobile phone 40 performs an operation of selecting a base station when waiting for a call from serving base station 30; with a plurality of peripheral base stations 30 being available for communication with mobile phone 40. Once mobile phone 40 is turned on, it awaits a call while not engaged in initiating a call.

In the example shown in FIG. 3, it is assumed that a base station 30 is pre-selected as a serving base station. Data received from the pre-selected base station 30, such as available radio channel(s) is assumed to be pre-stored in data storage area 409a. Hereafter, a base station currently communicating to and from mobile phone 40 is referred to as 'serving base station 30'; and another base station capable of handling a communication to and from the mobile phone 40 is referred as 'a peripheral base station 30'.

As shown in FIG. 3, CPU 401 measures states of communication paths to peripheral base stations 30 (step S101). In particular, CPU 401 controls wireless communication unit 404 to measure reception levels of signal radio waves received from the peripheral base stations 30. CPU 401 uses a measured reception level as state of a communication path. CPU 401 may also use an error rate of the signal radio waves received from the peripheral base stations 30 as a state of a communication path.

CPU 401 reads out the parameter 'Qhyst' from non-volatile rewritable memory 409, and determines, by taking account of the parameter 'Qhyst', whether equation 1 holds for states of communication paths to a serving base station and to any one of peripheral base stations 30. (step S102).

$$\text{(state of communication path to a peripheral base station)} > \text{(state of communication path to a serving base station)} + Qhyst \quad (1)$$

In equation 1, the parameter 'Qhyst' may be set to '0'. CPU 401, then, simply compares states of communication paths to any one of peripheral base stations 30 and serving base station 30 in accordance with equation 1.

In the case that equation 1 does not hold for any peripheral base stations 30, then CPU 401 branches its operation to step S103, resets the timer/counter to '0', and returns its operation to step S101. Otherwise, when equation 1 holds for one of peripheral base stations 30, then CPU 401 advances its operation to step S104. In step S104, CPU 401 determines whether a time counting operation has been already started. In the case that a time counting operation has started, then CPU 401 advances its operation to step S107.

Otherwise, when a time counting operation has not started, CPU 401 starts a time counting operation for the peripheral base station 30 for which equation 1 holds (step S105), and starts receiving an advertisement message transmitted from the peripheral base station 30 (step S106). CPU 401 stores the received advertisement message in RAM 408.

CPU 401 reads out the parameter 'Treselection' from non-volatile rewritable memory 409, and determines whether the timer/counter elapses beyond the parameter 'Treselection' (step S107). CPU 410 repeats the operation of steps S101 to S107, until the timer/counter elapses beyond the parameter 'Treselection'. In the present embodiment, the parameter 'Treselection' is set to be sufficiently long to receive an advertisement message from base station 30.

In the event that the timer/counter elapses beyond the parameter 'Treselection' (YES in step S107), then CPU 401 updates data storage area 409a by using the advertisement message stored in RAM 408, which was transmitted from the peripheral base station 30 (step S108). Thus, the peripheral base station 30 changes to act as a serving base station. CPU 401 resets the timer/counter to '0' (step S109), and finishes the operation of selecting base station 30.

After selecting serving base station 30, mobile phone 40 establishes a wireless connection and starts communication with the newly selected serving base station 30 by using data stored in data storage area 409a, so as to perform a location registration operation, or operations of making or receiving a call.

Figure 4:
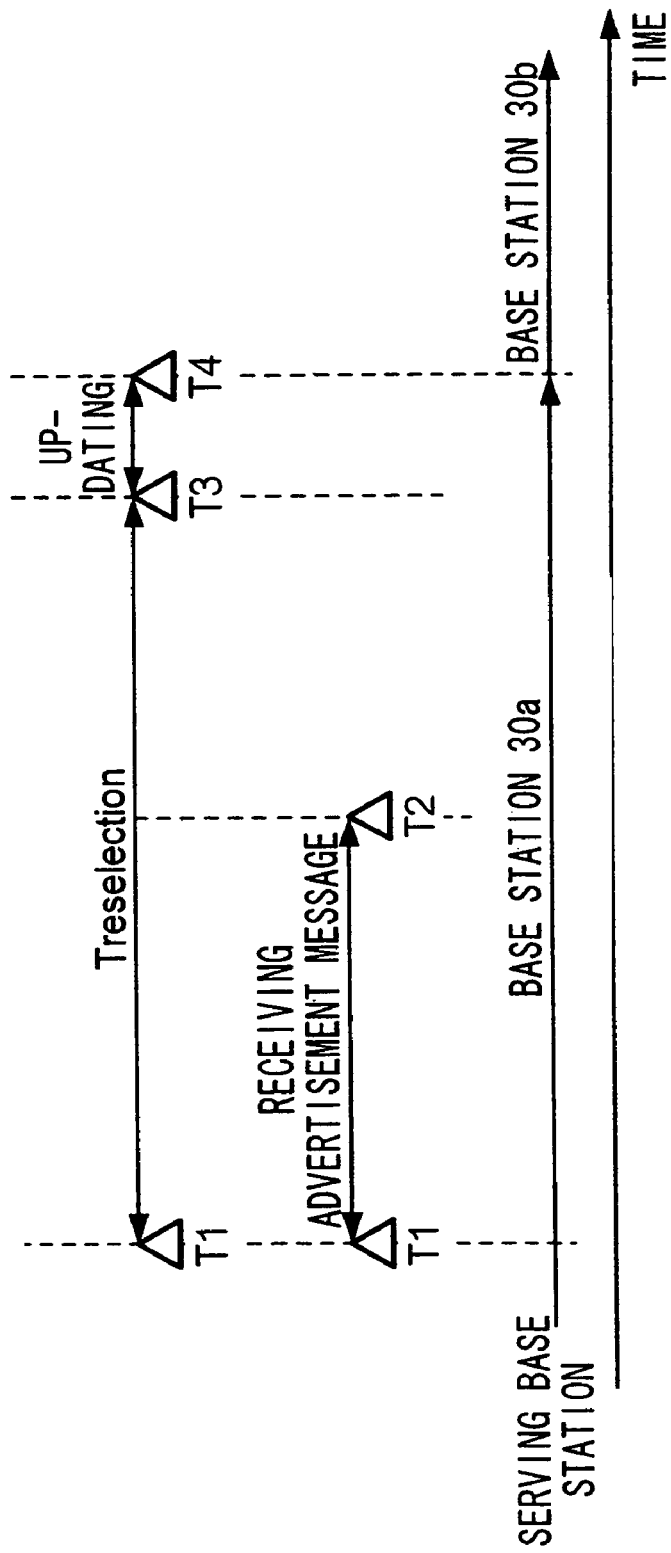
FIG. 4 is a timing chart illustrating the operation of selecting a base station according to the first embodiment.

FIG. 4 is a timing chart illustrating the operation of selecting a base station 30 according to the present embodiment. In the example shown in FIG. 4, it is assumed that until timing T1 base station 30a acts as a serving base station and base station 30b acts as a peripheral base station. At and from timing T1, equation 1 is assumed to hold for a serving base station (base station 30a) and for a peripheral base station (base station 30b). Then, mobile station 40 starts receiving an advertisement message from base station 30b as shown in FIG. 4. At timing T3, the time period for which equation 1 holds exceeds the parameter 'Treselection', mobile phone 40 determines base station 30b as a serving base station. Accordingly, it is only necessary in the present embodiment to update data storage area 409a by using the advertisement message from base station 30b stored in RAM 408, to accomplish the operation of changing a serving base station.

Figure 13:
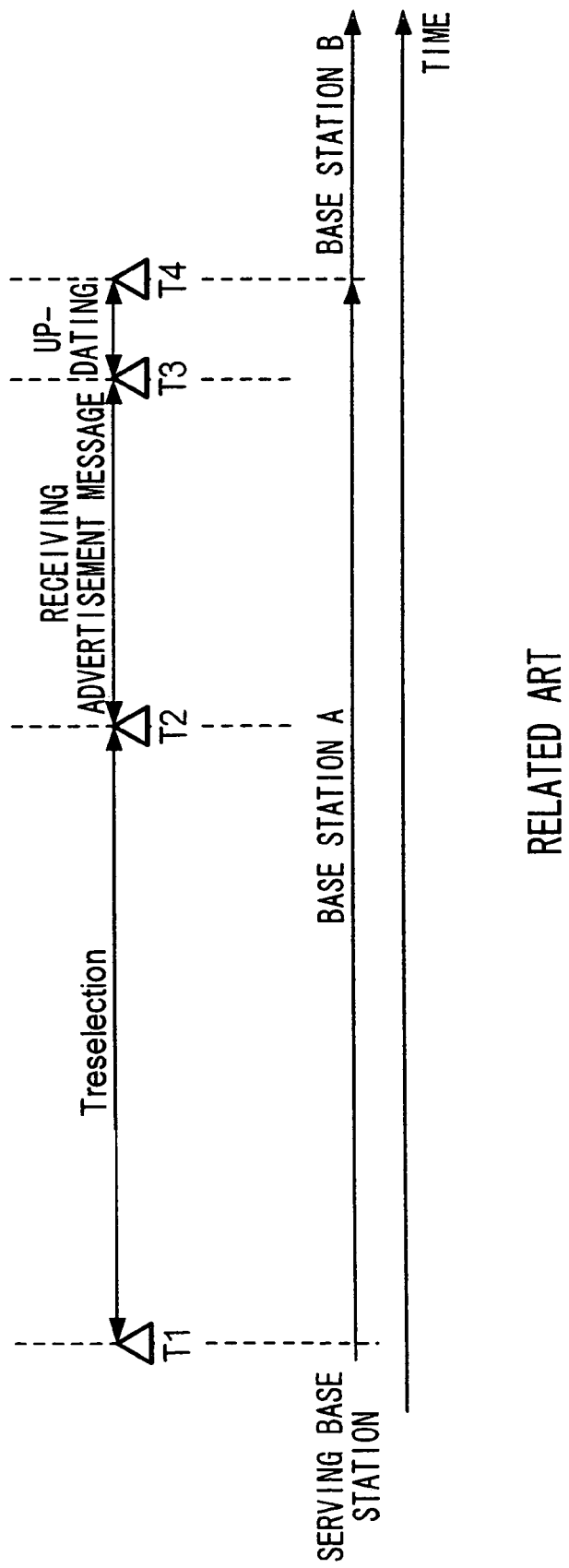

It will be apparent from the comparison with the mobile station in the related art shown in FIG. 13, that mobile phone 40 according to the present embodiment can shorten the overall processing time required to change serving base stations 30 by an amount of time required to receive an advertisement message. Also in another case that mobile phone 40 starts to receive an advertisement message before timing T3 shown in FIG. 4, mobile phone 40 can at least shorten the overall processing time required to change serving base stations 30, as compared to the mobile station in the related art.

A-3. Modification of the First Embodiment

In the above-described embodiment, a start timing of receiving an advertisement message is determined on the basis of equation 1, equation 2 may also be used for this purpose.

$$\text{(state of communication path to a peripheral base station)} > \text{(state of communication path to a serving base station)} + Qhyst + x \quad (2)$$

Figure 5:
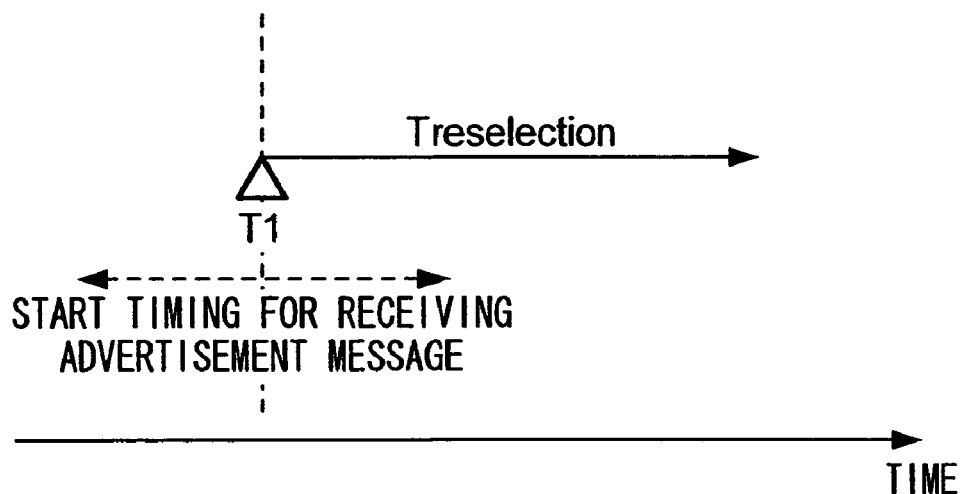
FIG. 5 is a timing chart illustrating details of the operation of selecting a base station according to a modification to the first embodiment.

In equation 2, the parameter 'x' is a second parameter for adjusting a quality of a communication. The start timing of receiving an advertisement message may be adjusted by changing the parameter 'x', within the time period indicated as a broken line with arrows in FIG. 5. The start timing advances forward in time when the parameter 'x' increases, and the start timing advances backward when the parameter 'x' decreases. The parameter 'x' may be set to be negative. In such a case, mobile phone 40 starts receiving an advertisement message earlier than the start timing determined by using equation 1. It is to be noted that equation 2 is used only to determine the start timing of receiving an advertisement message, and that the timer/counter starts counting an elapsed time at timing T1, at and from the time equation 1 holds.

Figure 6:
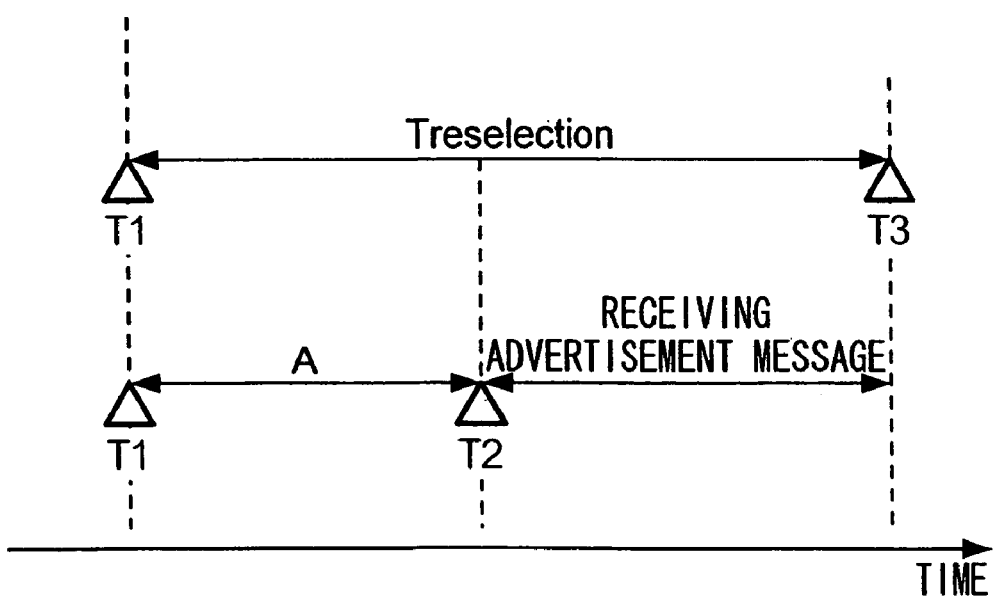
FIG. 6 is a timing chart illustrating details of the operation of selecting a base station according to the modification of the first embodiment.

The start timing of receiving an advertisement message may be determined as follows: first, a time period (hereafter referred as 'A') is measured, from starting an advertisement message to completing storage of the received advertisement message in RAM 408; second, the start timing of receiving an advertisement message is set to timing T2 as shown in FIG. 6, and the timing T2 is advanced by 'A' from timing T1. Accordingly, mobile phone 40 can, in the case that equation 1 holds only for a short time period, avoid commencement of reception of an advertisement message.

In the following second to fourth embodiments, the mobile phone has the same hardware configuration to that of the first embodiment. Accordingly, to avoid repetition, description of their hardware configurations will not be given, and only operations in the embodiments will be described.

B. Second Embodiment

Figure 7:
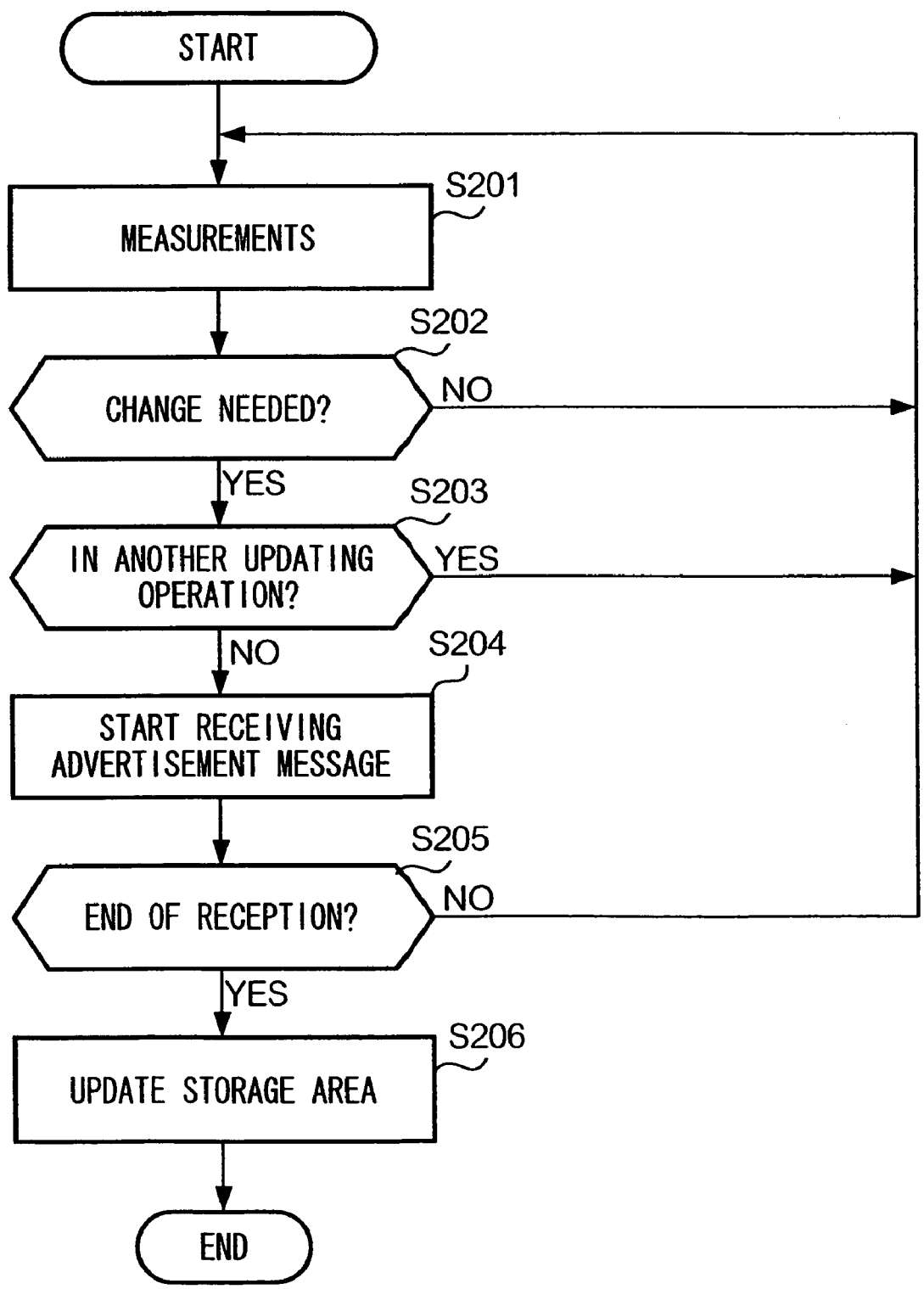
FIG. 7 is a flow chart illustrating an operation of selecting a base station according to a second embodiment.

FIG. 7 is a flow chart illustrating an operation of selecting a base station performed by CPU 401 in mobile phone 40 according to a second embodiment of the present invention. Similar to the first embodiment, mobile phone 40 according to the second embodiment performs an operation of selecting a base station, in a case that mobile phone 40 is waiting for a call from serving base station 30 and a plurality of peripheral base stations 30 are available for communication with mobile phone 40.

B-1. Operation

As shown in FIG. 7, CPU 401 measures states of communication paths to peripheral base stations 30. CPU 401 reads out the parameters 'Qhyst' and 'Treselection' from non-volatile rewritable memory 409. CPU 401 determines, by taking account of the measured states of communication paths and the parameters 'Qhyst' and 'Treselection', whether the time period while equation 1 holds elapses beyond the parameter 'Treselection' (step S201). Namely, in step S201, CPU 401 detects appearance/disappearance of the peripheral base station 30 for which a condition for changing serving base stations is fulfilled.

In the case that the time period does not elapse beyond the parameter 'Treselection', CPU 401 determines that mobile phone 40 does not need to change its serving base station 30 (NO in step S202). CPU 401 returns its operation to step S201. In the case that the time period elapses beyond the parameter 'Treselection', CPU 401 determines that mobile phone 40 needs to change its serving base station 30 (YES in step S202). CPU 401 advances its operation to step S203.

In step S203, CPU 401 determines whether a condition for changing serving base stations has been fulfilled for another peripheral base station 30, and data storage area 409a is currently updated with data received from the another peripheral base station 30 (step S203). Hereafter, the above-described operation will be referred as an 'update operation' that starts from detecting a peripheral base station 30 for which the condition for changing base stations is fulfilled, and ends in updating data storage area 409a.

In the cases, including that in which no other peripheral base stations 30 appear for which conditions for changing base stations have been fulfilled, all other update operations have been already completed, or no update operations have been performed for the detected peripheral base station 30, no update operations are running (NO in step S203). In such cases, CPU 401 advances its operations so as to perform an update operation for the newly detected peripheral base station 30. In particular, CPU 401 starts receiving an advertisement message from the peripheral base station 30 (step S204). When CPU 401 completes receiving the advertisement message (YES in step S205), CPU 401 updates data storage area 409a with data received from the peripheral base station 30 (step S206). Thus, peripheral base station 30 changes to act as a serving base station In another case when CPU determines in step S203 that another update operation is running, CPU 401 returns its operation to step S201. Alternatively, an operation of detecting another peripheral base stations 30 may be disabled while another update operation is running.

FIG. 8 is a chart illustrating an operation of selecting base station 30 according to the second embodiment. In the example shown in FIG. 8, it is assumed that prior to timing T1, base station 30a acts as a serving base station. In the present example, base station 30b is detected at timing T1, for which the condition for changing base stations 30 is fulfilled. CPU 401, then, starts receiving an advertisement message from base station 30b, and completes updating data storage area 409a with the received advertisement message received from base station 30b at timing T3. CPU 401 discontinues the detection of another base station 30 during a time period between timings T1 and T3. Accordingly, even in the case that the condition for changing base stations 30 is fulfilled for base station 30c at timing T2 (T1<T2<T3), the detection of base station 30c is discontinued, so that the update operation for base station 30b is not terminated at timing T2. Thus, base station 30b changes to act as a serving base station at timing T3.

In contrast, according to a mobile station of the related art, at timing T2 it is detected that the conditions for changing base stations are fulfilled for another base station 30c, as shown in FIG. 8, and the mobile station breaks the running update operation for base station 30b, and starts another update operation for the base station 30c. Accordingly, base station 30a acts as a serving base station until timing T4, and base station 30c takes over to act as serving base station at timing T4.

Namely, in the related art, base station 30a continues to act as a serving base station until timing T4 for the mobile station, even in the case that state of communication path to base station 30a is the worst among base stations 30a, 30b, 30c between timing T2 to timing T4. Accordingly, mobile station 40 may fail to establish a wireless connection with base station 30a during the time period, thereby failing to communicate with base station 30a. On the contrary, mobile phone 40 according to the present embodiment does not encounter such problems and is able to appropriately select at timing T3 base station 30b.

B-2. Modification of the Second Embodiment

In the second embodiment described above, it is assumed that (a) changes of base stations occur among base stations using the same radio frequency, or that (b) changes of base stations occur among base stations using different radio frequencies; and that mobile phone 40 has a plurality of wireless communication units and is able to establish a plurality of simultaneous wireless connection s using a plurality of radio frequencies. In such cases, mobile phone 40 is able to receive an advertisement message from any one of peripheral base stations 30, while waiting for a call from the serving base station 30.

However, the present invention may be applicable in a case that each base station 30 uses a unique radio frequency, and mobile phone 40 has only a single wireless communication unit and thus is unable to establish a plurality of wireless connection s simultaneously using a plurality of radio frequencies. In such a case, it is necessary for mobile phone 40 to switch to an appropriate radio frequency in the single wireless communication unit, so as to communicate with each base station 30. Accordingly, mobile phone 40 is not able to receive an advertisement message from any one of peripheral base stations 30, while waiting for a call from the serving base station 30. Namely, mobile phone 40 is not able to wait for a call from the serving base station 30, while receiving an advertisement message from any one of peripheral base stations 30.

In the example shown in FIG. 8, it is assumed that base stations 30a and 30b use the same radio frequency $f_0$, and base station 30c uses another radio frequency $f_1$. In such a case, a mobile station according to the related art receives an advertisement message in a frequency of $f_0$ from base station 30b from timing T1 through timing T2, and receives in a frequency of f1 from base station 30c from timing T2 through timing T4. Accordingly, the mobile station according to the related art is not able to wait for a call in a frequency of $f_0$ from base station 30a from timing T2 through timing T4.

In contrast, mobile phone 40 according to the modification of the second embodiment does not encounter any such problem and is able to select at timing T3 base station 30b appropriately while waiting for a call in a frequency of $f_0$ from base station 30a from a beginning through timing T4, even in a case that mobile phone 40 has only a single wireless communication unit and thus is unable to establish a plurality of wireless connection s by simultaneously using a plurality of radio frequencies.

C. Third Embodiment

Figure 9A:
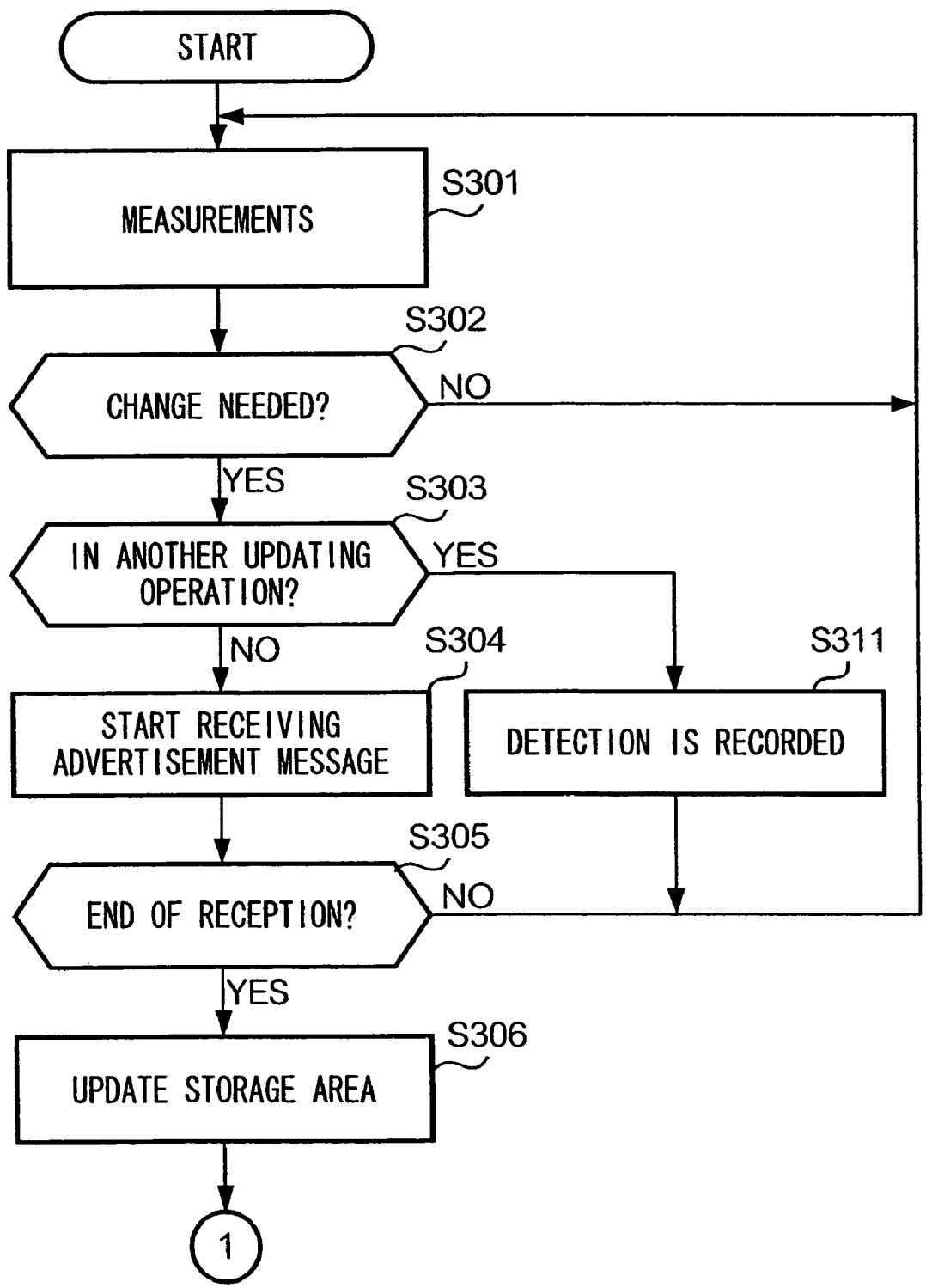
FIGS. 9A and 9B are flow charts illustrating an operation of selecting a base station according to a third embodiment.
Figure 9B:
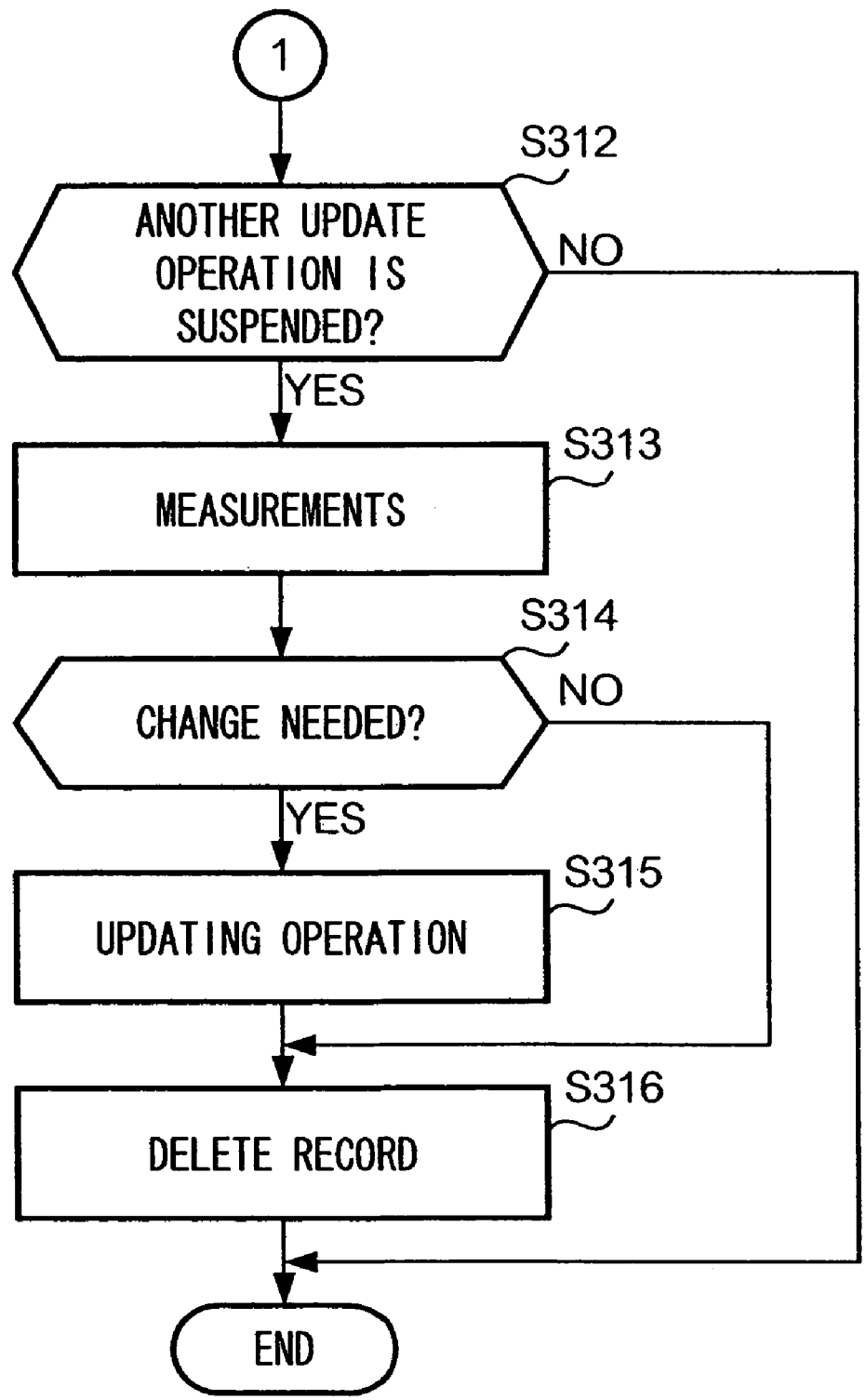

FIGS. 9A and 9B are flow charts illustrating an operation of selecting a base station performed by CPU 401 in mobile phone 40 according to a third embodiment of the present invention. The operations in steps S301 to S306 of the third embodiment are similar to the operations in steps S201 to S206 of the second embodiment. Accordingly only unique steps of the operation in the third embodiment will be described.

In the case that CPU 401 detects peripheral base station 30 in a condition that changing base stations is fulfilled while another update operation is running, CPU 401 stores a record of the detection of peripheral base station 30 (step S311). In particular, CPU 401 stores an indication of the newly detected peripheral base station 30, such as base station ID, in non-volatile rewritable memory 409. CPU 401 returns its operation to step S301.

CPU 401 completes receipt of the advertisement message from the peripheral base station 30 for which an update operation has been running. CPU 401 updates data storage area 409a with data received from the peripheral base station 30 (step S306). CPU 401, then, determines whether a record of the detection of the peripheral base station 30 is stored in non-volatile rewritable memory 409 (step S312). In the case that no record of the detection of the peripheral base station 30 is stored, CPU 401 finishes the selection operation.

In the case that a record of the detection of the peripheral base station 30 is stored (hereafter the peripheral base station 30 will be referred as recorded peripheral base station 30), CPU 401 measures and compares states of communication paths to the recorded peripheral base station 30 and that to serving base station 30 (step S313). In the case that the former state is inferior to the latter state of communication path, CPU 401 determines that no change of base stations is necessary (NO in step S314), deletes the record of the detection of the peripheral base station 30 in non-volatile rewritable memory 409 (step S316), and finishes the selection operation.

In the case that the former state is superior to the latter state of communication path, CPU 401 determines that a change of base stations is necessary (YES in step S314). In such a case, CPU 401 receives an advertisement message from the recorded peripheral base station 30, updates data storage area 409a with data included in the received message (step S315). Thus, the recorded peripheral base station 30 changes to act as a serving base station. CPU 401, then, deletes the record of the detection of the recorded peripheral base station 30 in non-volatile rewritable memory 409 (step S316), and finishes the selection operation.

FIG. 10 is a chart illustrating an operation of selecting a base station according to the third embodiment. In the example shown in FIG. 10, it is assumed that base station 30a acts as a serving base station through timing T1. CPU 401 detects at timing T1 that the condition for changing base stations 30 is fulfilled for base station 30b, and then starts receiving an advertisement message from base station 30b. CPU 401 stores a record of the detection of another peripheral base station 30 for which the condition for changing base stations 30 is fulfilled, in the case that CPU 401 detects the another peripheral base station 30 before timing T3 at which CPU 401 completes updating data storage area 409a in accordance with the received advertisement message from base station 30b. In the present example, CPU 401 stores a record of a detection of base station 30c at timing T2.

At timing T3, base station 30b changes to act as a serving base station 30, CPU 401 then measures, for comparison, states of communication paths to serving base station 30b and to peripheral base station 30c for which a record of the detection was stored at timing T2. In the present example, at timing T3, a state of communication path to peripheral base station 30c is superior to that to serving base station 30b. Accordingly, CPU 401 determines at timing T4 that a change of serving base station is needed from base station 30b to base station 30c, and starts receiving an advertisement message from base station 30c. Thus, base station 30a acts as a serving base station until timing T3, base station 30b does between timing T3 and timing T5, and base station 30c does after timing T5.

Accordingly, mobile phone 40 is able to appropriately select serving base station 30, since mobile phone 40 stores a record of the detection of a newly detected base station while performing an update operation for another base station.

D. Fourth Embodiment

D-1. Operation

Figure 11A:
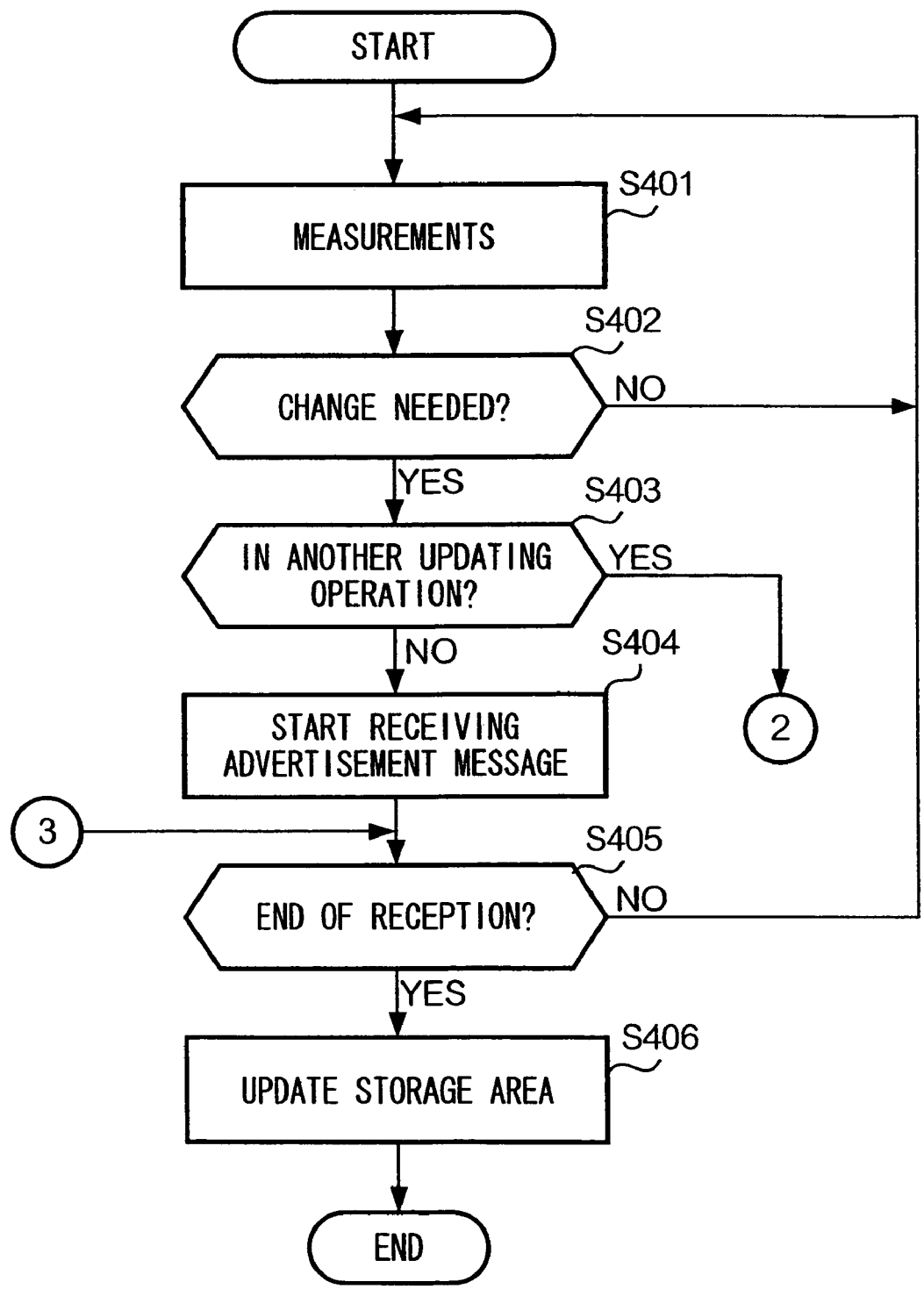
FIGS. 11A and 11B are flow charts illustrating an operation of selecting a base station according to a fourth embodiment.
Figure 11B:
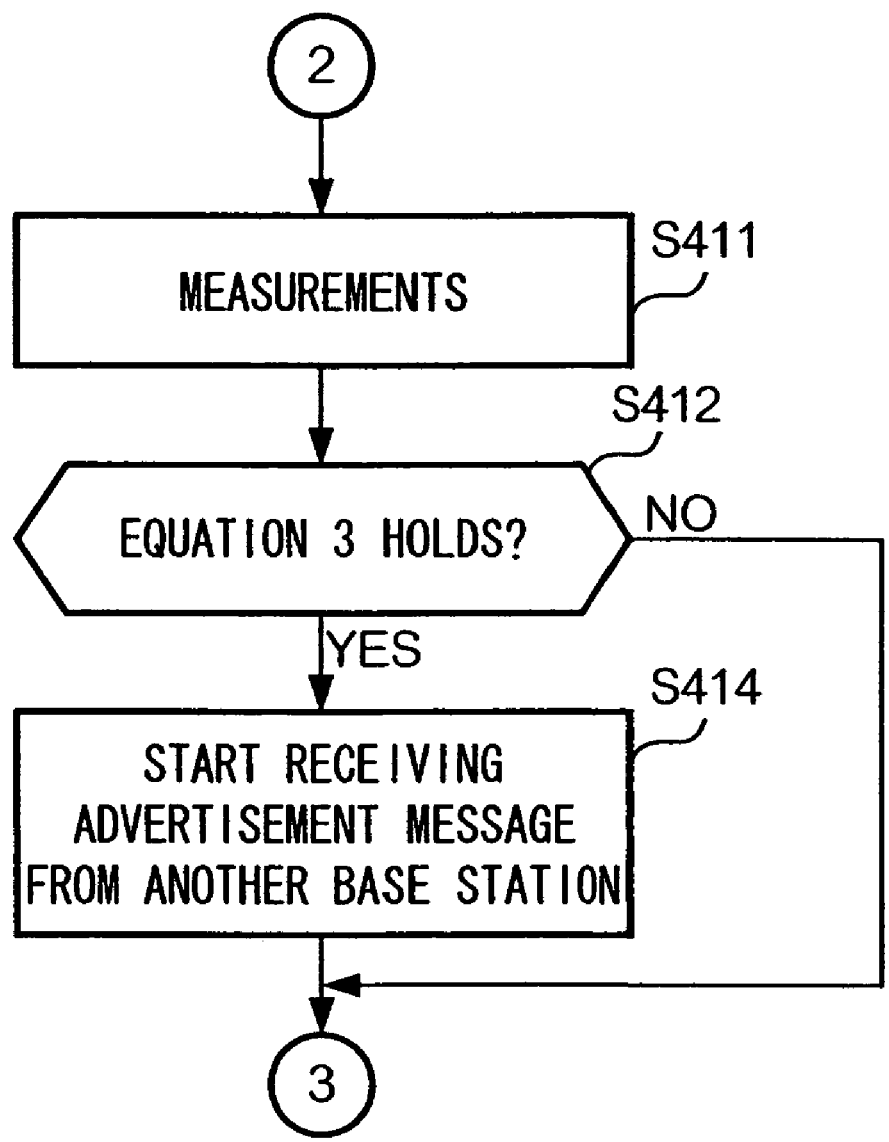

FIGS. 11A and 11B are flow charts illustrating an operation of selecting a base station performed by CPU 401 in mobile phone 40 according to a fourth embodiment. The operations in steps S401 to S406 of the third embodiment are similar to the operations in steps S201 to S206 of the second embodiment. Accordingly only unique steps of the operation in the third embodiment will be described.

In the case that CPU 401 detects peripheral base station 30 for which the condition for changing base stations is fulfilled while another update operation is running for another peripheral base station 30 (YES in step S403), CPU 401 advances its operation to step S411. CPU 401 measures states of communication paths to the newly detected peripheral base station 30 and to the peripheral base station 30 involved in the running update operation (step S411). CPU 401 then determines whether equation 3 holds for the newly detected peripheral base station 30 (step S412).

$$\text{(state of communication path to a newly detected peripheral base station)} > \text{(state of communication path to peripheral base station invovled in a running update operation)} + y \quad (3)$$

In equation 3, the parameter 'y' is a parameter for adjusting a quality of communication, and is set as a non-negative value. The parameter 'y' is stored in non-volatile rewritable memory 409, and has a similar function in equation 3 to the function of the parameter 'Qhyst' in equation 1. In one embodiment, the parameter 'y' is preset in mobile phone 40; in another embodiment, the parameter 'y' is set in accordance with a message transmitted from an exchange node which determines the parameter 'y' on the basis of communication traffic in mobile phone network 10 and/or a time of a day, and transmits the message including the parameter 'y'.

In the case that equation 3 does not hold (NO in step S412, CPU 401 jumps in operation to step S405.

In another case that equation 3 holds for the newly detected peripheral base station 30 (YES in step S412), CPU 401 discontinues the running update operation and starts another update operation for the newly detected peripheral base station 30 (step S413) and jumps in operation to step S405.

FIG. 12 is a chart for illustrating an operation of selecting a base station according to the fourth embodiment. In the example shown in FIG. 12, it is assumed that base station 30a is selected as a serving base station until timing T1. CPU 401 detects at timing T1 that the condition for changing base stations is fulfilled for base station 30b, and then starts receiving an advertisement message from base station 30b. CPU 401 measures at timing T2, for comparison, states of communication paths to base station 30b involved in the running update operation and to base station 30c, in the case that CPU 401 detects at timing T2 another peripheral base station 30 (base station 30c) before timing T3 at which CPU 401 completes updating data storage area 409a in accordance with the received advertisement message from base station 30b.

CPU 401 determines to select a base station 30 among base station 30b involved in the running update operation and the newly detected base station 30c in accordance with equation 3 with measured states of communication paths. In the example shown in FIG. 12, state of communication path to the newly detected base station 30c is at timing T2 much lower than the sum (indicated 'Y' in the figure) of state of communication path to base station 30b involved in the running update operation and the parameter 'y' (indicated vertical line with both sided arrow). Accordingly, CPU 401 determines to continue the running update operation for base station 30b. Thus base station changes to act as a serving base station at timing T3.

On the contrary, a mobile station according to the related art discontinues a running update operation for base station 30b when detecting that the condition for changing base stations is fulfilled for another base station (base station 30c), even in the case that state of communication path to base station 30b is superior to that to base station 30c. The mobile station starts another update operation for the newly detected base station 30c.

As will be apparent from this comparison, mobile phone 40 according to the present embodiment is able to appropriately and efficiently select serving base station 30.

D-2. Modification of the Fourth Embodiment

As described earlier, in the case that each base station 30 uses a unique radio frequency and mobile phone 40 has only a single wireless communication unit and thus is unable to establish a plurality of wireless connection s simultaneously using a plurality of radio frequencies, mobile phone 40 is not able to wait for a call from the serving base station 30, while receiving an advertisement message from any one of peripheral base stations 30.

Taking into account such cases, the parameter 'y' used in equation 3 may vary from that used in the case that changes of base stations occur among base stations using the same radio frequency to that used in a case that changes of base stations occurs among base stations using different radio frequencies. In the latter case, it is not recommended that the parameter 'y' is set to be greater than that used in the former case.

E. Modification

E-1. In the first through fourth embodiments described above, it is assumed that one or more computer programs are preinstalled in ROM 407 and/or non-volatile rewritable memory 409. Mobile phone 40 performs operations of selecting a base station according to the first through fourth embodiments, by executing the computer programs. However, such programs may be downloaded from a network onto mobile phone 40 or installed from a computer readable medium as provided.

E-2. The present invention can be applied, for example, to mobile stations such as those accommodated within a mobile packet communication network, and which have a functionality of performing packet communication; to a wireless communication terminal accommodated in a public wireless LAN; and to PHS(Personal Handyphone System: Registered Trademark) station. Further, the present invention can also be applied to a mobile station that has a communication module unit for controlling mobile communication, such as a wireless LAN interface card.

What is claimed is:

1. A mobile station comprising:
   a measuring unit configured to measure states of communication paths to a plurality of base stations;
   a receiving unit configured to receive, information from a base station;
   a storage unit configured to store data;
   a detecting unit configured to detect a candidate base station from among the plurality of base stations, the candidate base station being a base station that satisfies a predetermined condition for communication with the mobile station;
   an updating unit configured to perform an update operation, the update operation including an operation that the receiving unit receives information required for communication with the candidate base station, and an operation that the updating unit updates data stored in the storage unit with the information received by the receiving unit;
   a cancel unit configured to cancel a detecting result from a timing when the updating unit initiates the update operation for a first candidate base station to a timing when the updating unit terminates the update operation for the first candidate base station, even if a second candidate base station is detected by the detecting unit and
   a communication unit configured to communicate with a base station identified by the information stored in the storage unit.

2. The mobile station of claim 1, wherein
   the cancel unit is configured to control the storage unit to store a record of the second candidate base station if the detecting unit detects that the second candidate base station satisfies the predetermined condition from a timing when the updating unit initiates the update operation for the first candidate base station to a timing when the updating unit terminates the update operation for the first candidate base station;
   the measuring unit is configured to measure states of communication paths to the first candidate base station and to the second candidate base station when the update operation for the first candidate base station is completed; and
   the updating unit is configured to initiate the update operation for the second candidate base station if the measured states indicate that a quality of the communication path for the second candidate base station is higher than that for the first candidate base station.

3. The mobile station of claim 1, wherein
   the measuring unit is configured to measure states of communication paths to the first candidate base station and to the second candidate base station if the detecting unit detects that the second candidate base station satisfies the predetermined condition from a timing when the updating unit initiates the update operation for a first candidate base station to a timing when the updating unit terminates the update operation for the first candidate base station; and
   the update unit is configured to cancel the update operation for the first candidate base station and to initiate the update operation for the second candidate base station if the measured states indicate that the quality of the communication path for the second candidate base station is higher than that for the first candidate base station, with a parameter for adjusting a quality of communication being included.

* * * * *

UNITED STATES PATENT AND TRADEMARK OFFICE
CERTIFICATE OF CORRECTION

PATENT NO. : 7,493,137 B2
APPLICATION NO. : 10/854945
DATED : February 17, 2009
INVENTOR(S) : Mitsuo Iwanaga et al.

It is certified that error appears in the above-identified patent and that said Letters Patent is hereby corrected as shown below:

On the Title Page

Item (75), after "Iwanaga," delete "Yokohama", and substitute --Yokohama-shi-- in its place.

Item (75), after "Ida," delete "Yokosuka" and substitute --Yokosuka-shi-- in its place.

Item (75), after "Matsuno," delete "Yokohama" and substitute --Yokohama-shi-- in its place.

Item (75), after "Uno," delete "Kamakura" and substitute --Kamakura-shi-- in its place.

In the Claims

In column 14, claim 1, line 4, immediately after "by the detecting unit" insert --;--.

Signed and Sealed this

Eighth Day of September, 2009

David J. Kappos
*Director of the United States Patent and Trademark Office*